United States Patent [19]

Waters et al.

[11] 4,299,491
[45] Nov. 10, 1981

[54] NONCONTACT OPTICAL GAUGING SYSTEM

[75] Inventors: James P. Waters, Ellington; Robert K. Thornton, Coventry, both of Conn.

[73] Assignee: United Technologies Corporation, Hartford, Conn.

[21] Appl. No.: 102,310

[22] Filed: Dec. 11, 1979

[51] Int. Cl.³ .......................................... G01B 11/24
[52] U.S. Cl. ...................................... 356/376; 356/4
[58] Field of Search .................. 356/3, 4, 373, 375, 356/376

[56] References Cited

U.S. PATENT DOCUMENTS

| | | | |
|---|---|---|---|
| 3,589,815 | 6/1971 | Hosterman | 356/376 |
| 3,856,411 | 12/1974 | Zanoni | 356/386 |
| 3,909,131 | 9/1975 | Waters | 356/376 |
| 3,986,774 | 10/1976 | Lowrey et al. | 356/376 |
| 4,183,672 | 1/1980 | Raber et al. | 356/376 |

*Primary Examiner*—R. A. Rosenberger
*Attorney, Agent, or Firm*—Robert E. Greenstien

[57] ABSTRACT

A laser beam is focused to a spot on the surface of an object whose contour is to be measured. The spot is projected from the surface onto a detector by a reciprocating mirror which scans the spot across the detector. The detector produces two output signals consisting of sequential pulses at the frequency scan. The relative duration of these pulses or duty cycle reflects the change in contour dimension with respect to the scan centerline or mid point that corresponds to the base or zero dimension of the contour surface. The duty cycle is utilized to compute the change in contour dimension and to move the optics in such a way as to allow the spot to be continually scanned across the detector. The movement of the optics is made whenever there is a certain contour dimension change and by correlating the movement in the position of the optics and the instantaneous computed contour change reflected in the scan, the actual contour dimension is obtained.

6 Claims, 4 Drawing Figures

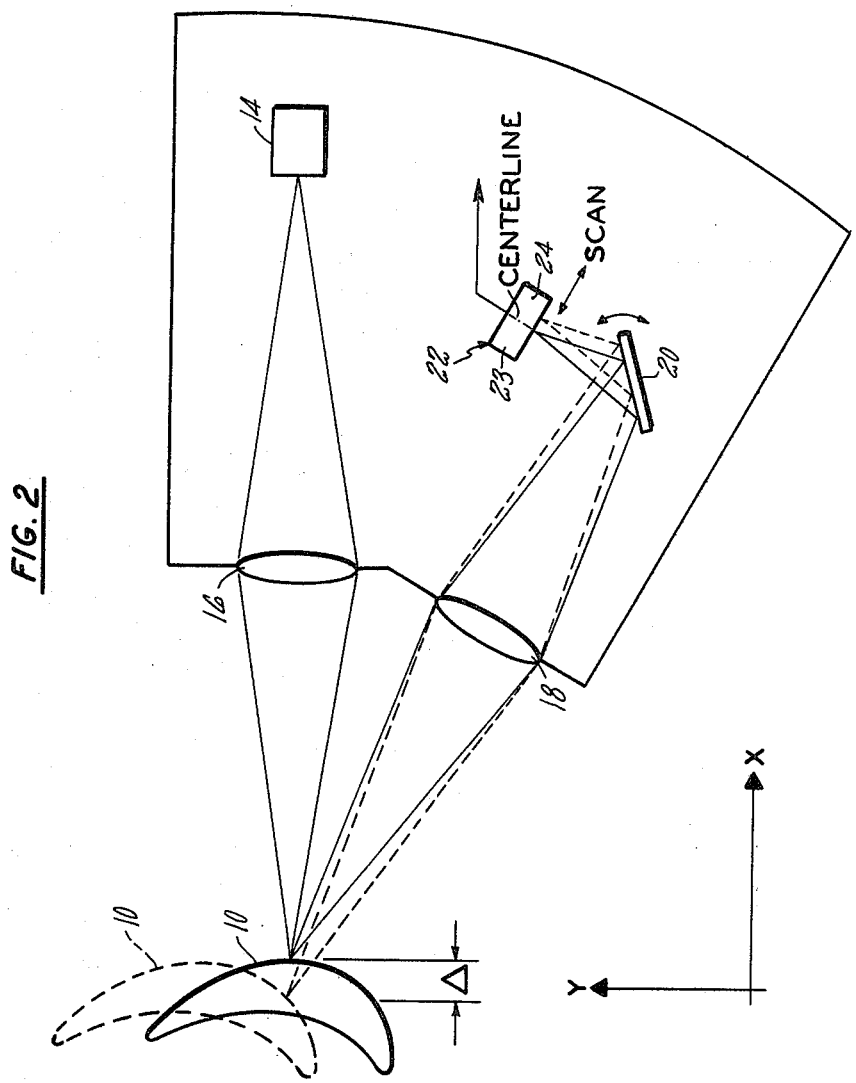

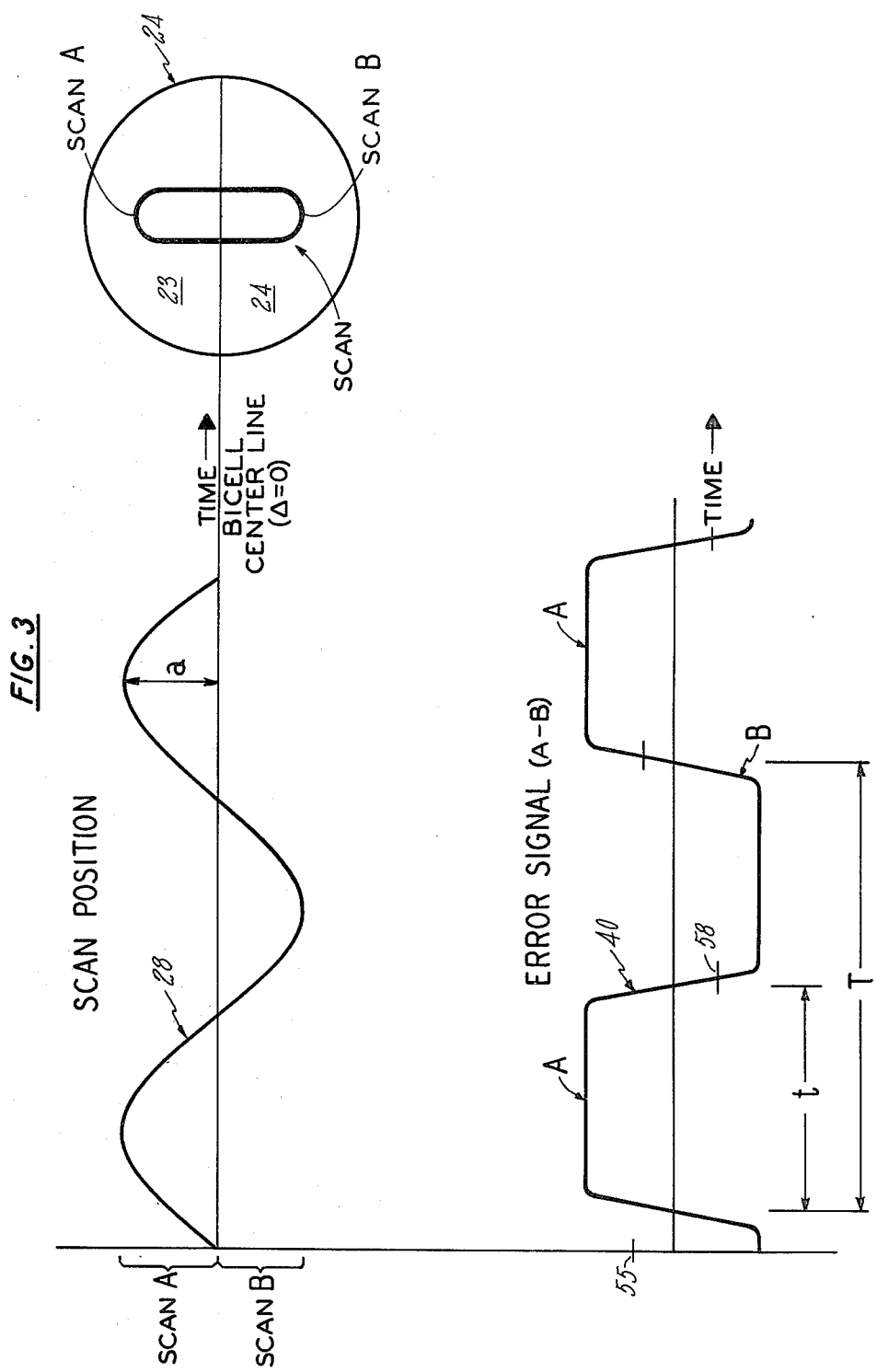

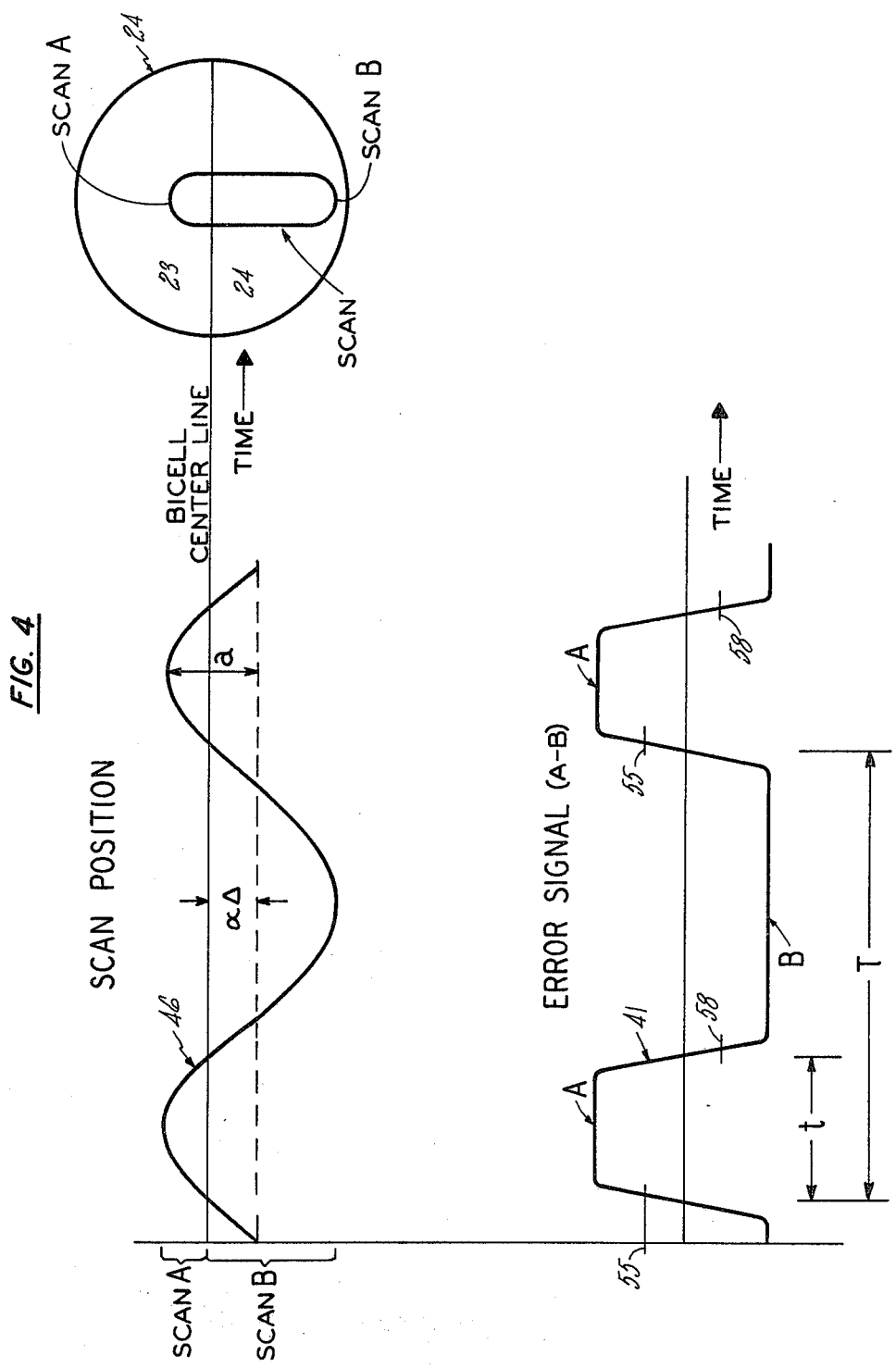

NONCONTACT OPTICAL GAUGING SYSTEM

DESCRIPTION

1. Technical Field

This invention relates to apparatus for measuring the contour of a scattering surface—gauging—through the use of focused electromagnetic radiation.

2. Background Art

A system for measuring the contour of an object is shown and described in my U.S. Pat. No. 3,909,131 on SURFACE GAUGING BY REMOTE IMAGE TRACKING, which is commonly owned herewith. There a radiation source and a radiation detector are trigonometrically related to provide rapid measurement of contour variations on the surface and with about 100 microinch accuracy. A focus spot of radiation is moved in discreet increments across the surface and contour variations are measured by electronically following the position of an image of the spot on a detector array and recording the amount of relative detector motion required to cause the image spot to go through a null position without having to bring the image spot to rest at null. A source of intensity modulated electromagnetic, e.g. a laser, radiation is directed onto the surface of a diffusely scattering specimen along a first axis of propagation by radiation concentrating means and a collecting means projects an image spot of some of the scattered radiation onto the detector along a second axis of propagation to provide electronic signals which are indicative of the position of the image spot. As the source radiation advances across the surface of the specimen the detector is moved with respect to the specimen in response to the electronic signals to cause the image spot to drive toward a null position on the detector. Calibrated recording means register the variations on the surface of the specimen, as manifested by the travel of the image spot on the detector. The displacement of the image spot on the surface of the detector is essentially proportional to the variation in the surface contour of the test specimen and the actual calibration of the recording means is derived from a trigonometric function using the angle formed by the intersection of the first and second axes of propagation.

U.S. Pat. No. 3,986,774 to Lowry, et al, on GAUGING SURFACES BY REMOTELY TRACKING MULTIPLE IMAGES, also commonly owned herewith, discloses another system which overcomes certain shortcomings of the system which is the subject of U.S. Pat. No. 3,909,131: the shadowing effect which is encountered with certain types of surface contours. For example, in gauging a curved surface having fin-like projections those surface irregularities can interfere with the line of sight between the detector and the spot on the surface from which the incident radiation is scattered. Consequently, various points on the surface that are measured adjacent to raised or sunken areas are shadowed from the detector and therefore no data is obtainable for those points. U.S. Pat. No. 3,986,774 discloses a system that uses a source of electromagnetic radiation which is directed onto the surface to be gauged and a plurality of optical sensing elements which are located at positions that are precise with respect to the surface. Consequently, the continuity of scattered radiation reaching the detection means can be maintained with a plurality of individual detectors located with respect to the surface and, therefore, at all times at least one of these detectors has a line of sight to the spot of radiation on the surface and thus provides a means for determining the contour, despite any shadowing that may occur with respect to the other detectors from the surface irregularities.

The system envisioned by both of the foregoing patents, and particularly U.S. Pat. No. 3,986,774 are predicated on a closed loop system for moving the light source or object with respect to each other in such a way as to refocus the reflected spot onto a detector for nulling. To do that, a closed loop position control system is utilized which has a finite gain and consequently gives rise to an expected minimum error in the contour measurement from the error at the loop summing point. By increasing the open loop gain of this system the error is decreased, but that increases the system's instability. When measuring contoured surfaces having sharp discontinuities this inaccuracy does not present a problem because the ringing that results in the detector output can be used to find the actual change in position by detecting the zero level crossing point in the ringing detector output resulting from the relative movement between the object and the detector.

However, when measuring the surface contour of objects which are comparatively smooth (devoid of sharp discontinuities), that ringing is not present and, consequently, the system's accuracy is limited by the open loop gain of the system which, in turn, is limited by factors controlling overall system stability. Thus, the state of the art manifests the need for a gauge measuring system that is particularly suited for measuring contours having smooth qualities as well.

DISCLOSURE OF INVENTION

According to the present invention the spot (radiation from a radiation source) that is focused onto the surface contour is imaged and scanned across a detector (e.g. a bicell detector) which produces two output signals reflecting the duration of the scan on either side of a scan centerline or mid point which corresponds to the base or zero surface contour dimension. As the contour dimension changes from the base dimension, the scan is displaced with respect to the centerline (due to the change in the optical axis) and thus the signals change relative to each other in their duration because the scan spends more time on one side of the centerline than the other. For example, if the scan time on each side of the centerline is the same, then no dimensional change has occurred. By correlating the scan length amplitude (a) for the base contour and the signal duty cycle t/T (t being the time on one side of the centerline and T being the scan period) the contour dimensional change (Δ) may be calculated from this equation:

$$\Delta \propto a \sin[\pi(t/T + \tfrac{1}{2})] \tag{1}$$

Thus a system embodying the present invention may utilize a scanning mirror which is reciprocated at a rapid rate (F) so as to scan the spot across two photodetectors (bicell detector) that produce signals (sequential pulses) at the frequency F, whose time widths manifest t and T and from which the contour dimension change may be calculated.

A feature of the invention is that the dimension is derived completely without the need for a complex servo system to move the lenses and detectors, as in the prior art. Further, since the scan rate may be high, it is possible to move the contoured object rapidly and yet obtain precise measurement. That is, a system employing the present invention provides for very fast contour measurement.

One system embodying and featuring the invention moves the optics and detector to reposition the scan on the detector when the dimension changes by a certain amount (predetermined contour dimension (PCD)). This system can measure large changes with greater accuracy and speed than the prior systems that move the optics to null the image on a detector. One reason is that this system is not closed loop and the measurement is determined from the scan; the optics and detector are moved simply to compensate for the scan's movement on the detector as the dimension change exceeds the PCD so that the scan is never positioned off the detector. Since this system may be open loop, high speed is possible. Accurate movement is not very critical since its principal purpose is to reposition the scan. In one embodiment of this system the movement of the optics and detector are encoded to measure the optics and detector movement and by summing that encoded "course" dimension with the "fine" dimension from the scan to the total change is determined. But this is merely one way to utilize the fine resolution (made by scanning the image) over a wider range in dimension, without increasing the size of the scan.

Thus a particular feature of the present invention is that a closed loop servo system is not needed and thus superior resolution is obtained.

Another feature is that a high scan speed permits more rapid movement measurement.

BRIEF DESCRIPTION OF DRAWINGS

FIG. 2 is a schematic diagram of the optics portion of the system in FIG. 1 and shows the measurement of a contoured object in a moved position in the Y direction, with respect to the optics, for measuring the contoured dimension change in the X direction;

FIG. 3 consists of two waveforms on a common time base; one waveform shows the position of the scan with reference to a bicell centerline corresponding to the base or zero dimension; the other waveform shows an error signal consisting of the difference between the resulted outputs of the bicell from the scan; both waveforms (pulses) reflect the zero or base dimension.

FIG. 4 consists of the same waveforms as shown in FIG. 3, but here they reflect the dimension $\Delta$, as measured at the object's moved position in FIG. 2.

BEST MODE FOR CARRYING OUT THE INVENTION

Figure 1:
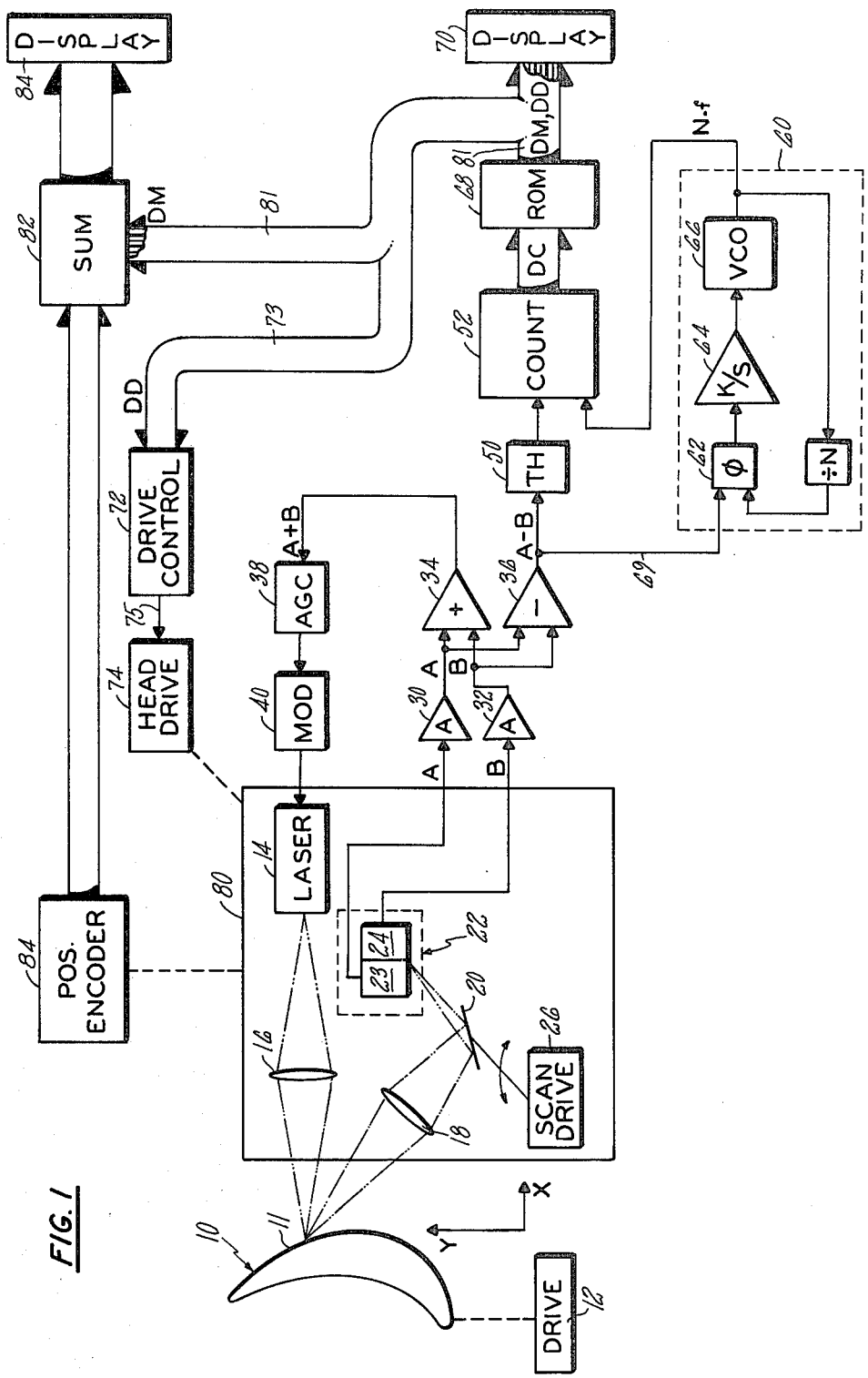
FIG. 1 is a functional block diagram of a gauge measuring system embodying the present invention.

In the system in FIG. 1 a contoured object 10 is moved in the Y direction by a driver 12. This motion is transverse to an optical system which includes a source of electromagnetic energy 14 (radiation source), a laser, whose output is passed through a lens 16 which directs (focuses) the laser's output into a spot on the surface 11 of the object 10. The light from the spot is scattered from the surface and collected by a lens 18 which focuses via a scanning mirror 20 onto a "bicell" detector 22 that contains two cells 23, 24. These cells produce output signals A and B on the output lines. The mirror 20 is mechanically connected to a scan drive 26 which moves the mirror back and forth in a reciprocating manner (at a frequency F) so as to cause the spot, which is focused onto the detectors 22, to move transversely back and forth thereacross in a scanning manner. That scan consists of scan A and scan B, scan A being the scan portion in the cell 23 and scan B being the portion in cell 24. The waveform 28 in FIG. 3 illustrates the scan with respect to the bicell 22. The scan position there represents a "neutral" position, where the scan equally covers or impinges upon the cells 23, 24 and equally this corresponds to the zero or base dimension. The scan A causes cell 23 to produce a pulse A and scan B causes cell 24 to produce a pulse B. The output signal from the cell 23 (pulse A) is supplied to a buffer amplifier 30 and the output signal from the cell 24 (pulse B) is supplied to the input of a similar buffer amplifier 32. These buffer amplifiers merely function to raise the overall signal level. The output of these buffer amplifiers 30, 32 are supplied to an adder 34 and a subtractor 36. The output of the adder represents the sum of the two signals A, B from the cells and is supplied to the input of an AGC circuit 38 whose output is supplied to the laser irradiance modulator 40 in order to control the laser irradiance so as to maintain a constant aggregate output from the two cells. The subtraction circuit 36 produces an error (difference) signal 40, 41 representing the difference between the outputs of the cells, and since those output signals (pulses) are obviously out of phase with each other (as manifested by the scan position waveform 28, 46 this results in an error signal as shown by the waveforms 40, 41. This error signal has a comparatively square wave characteristic because the cell output is constant when the light is all on one side. When there is no dimensional change (e.g. in FIG. 2 the object's surface has not been moved relative to the optics and detector in the Y direction to the moved position) the scan time is equally divided between the cells and thus the duty cycle of the pulse A in waveform 40 is 50%. That is, the duration (t) of the output signal A is ½ of the overall time (T) of the scan, the duration of pulses A and B.

In FIG. 4 the object's surface is assumed to have been moved in the Y direction as depicted in FIG. 2, where dotted lines show the moved position and the resultant "imaging". As a result of this movement, the dimensional contour change ($\Delta$) from the base dimension shifts the spot's location on the mirror 20 and, hence, the scan A no longer equals scan B. As a result, the error signal (waveform 41) now has a smaller duty cycle (t/T). The duty cycle manifests the dimensional change $\Delta$, as expressed in the following equation:

$$\Delta \propto a \sin [\pi(t/T + \tfrac{1}{2})] \tag{1}$$

The error signal is supplied to a threshold circuit 50 whose output is supplied to the control terminal of a counter 52. The threshold circuit 50 produces a count enabling signal which activates the counter when the error signal exceeds a level 55 and deactivates the counter when the error signal exceeds a negative level 58. The time between those levels is t. The count input to the counter 52 is supplied from the output of a frequency synthesizer 60 on a line 67. The synthesizer input is connected over a line 69 to the output from the subtracting amplifier 36 so as to receive the error signal 40 (A-B). This synthesizer contains a phase detector 62 whose output is connected to an integrator 64 whose variable D.C. output is supplied to a voltage controlled oscillator (VCO) 66. The output from the voltage controlled oscillator is applied to a divide by "N" circuit whose output is supplied to a second input on the phase detector 62. The frequency synthesizer 60 consequently produces an output signal on the line 67 from the input (A-B) which has a frequency of N·F where F is the frequency of the error signal. The net result is that T is divided into N resolvable time intervals. Thus upon the count actuating signal (CA) from the threshold circuit 50 the counter counts the output from the VCO 66 until the count actuation signal is discontinued. The resultant count stored in the counter thus represents the number of counts in the time t and is independent of the scan frequency F. The signal output from the counter is an indicia, a binary word (DC), which reflects the duty cycle and which is supplied to a ROM 68 which is programmed (contains a "look-up table" to generate another signal indicia, a binary word (DM), addressed by the DC word and indicating the dimension change. The DM word is supplied to a display 70 to cause the display to display the dimension of $\Delta$ corresponding to the DM word.

The ROM output is also supplied to a drive control 72 over lines 73. The output of the control 72 is connected to a head drive unit 74 over a line 75 and may simply consist of a stepping motor and associated linkages connected to the head unit 80 containing the "optics" (laser, detector and lens). The head is movable by the head drive with respect to the workpiece 10 in the X direction. The drive unit is actuated by a particular word (DD word) from the ROM on the lines 73 when the DC word manifests a predetermined contour dimensional change (PCD change). This causes the head 80 to move so as to relocate or reposition the spot on the detector 22, thus shifting the scan relative to the cells 23, 24 in a direction to readjust the duty cycle to about 50%. Essentially what this does is to cause the head 80 to move in such a way that the error signal is adjusted to about a 50% duty cycle (FIG. 3), and this occurs when the scan on the bicell is readjusted as a result of the movement of the head which causes the scan along the bicell to be displaced transversely with respect to the centerline.

The ROM 68 output is also connected, over lines 81, to a digital summing circuit 82 whose output is supplied to another display 84. This output represents the sum of the ROM output displayed on the display 70 and a digital output from a position encoder 84, producing an encoded word manifesting the aggregate PCD changes associated with the movement of the optics.

Since the dimensional change is measurable simply through the use of the scan mirror 20, the limits arise primarily from the scan amplitude. For that reason the head is movable so as to readjust it to nearly the same "null" position (scan A = scan B) when there is a PCD change. Still the thrust of the invention is the use of the scanning mirror—independent of the head in such a way that extremely high resolution is achievable without the use of a closed loop head movement system and thus without the attendant stability problems with a servo loop. What this means is that processing of the optical information in this fashion has all the advantages of the previous gauging systems yet the added advantage in that the servo system does not induce an inherent error. Typical accuracy for this system is on the order of 250 microinches with a range that is dependent merely on the length of the transitional stage on which the optical head is mounted. Displacement as large as 50 milli-inches can be easily measured at a rate of 4000 times per second. This means that one measurement can be made every 250 microsecnds. As stated, for small displacements the optical head need not move at all and, in fact, displacements on the order of plus or minus 0.5 inches typically can be accommodated with accuracy of $\pm 1$ milli-inch without requiring the need for a servo system to move the head at all. Obviously, even though two displays 70, 84 have been shown to show a fine and overall contour dimensional, a single or composite display can be utilized. Similarly, even though the system has been shown in a comparatively "hard-wired", discreet digital system, there are no doubt analog and hybrid-analog digital equivalents that can operate in a similar, if not identical manner.

Obviously, the invention can be used with a dual optical arrangement as shown in my U.S. Pat. No. 3,986,774 and the consequent system would possess both the benefits of the system previously discussed embodying this invention and would be unaffected by shadowing.

The previous discussion of one embodiment of the present invention may suggest, to one skilled in the art, numerous modifications, variations, and alterations therein and thereto without departing from the true scope of the invention embodied therein as described and defined in the claims.

We claim:

1. A gauging system for measuring the contour dimension of objects, comprising:
   means for focusing the radiation output from a radiation source onto the surface of the object,
   a detector for generating at least two signals whose relationship manifests the scan distance on each side of a detector centerline which corresponds to a base contour dimension,
   imaging means located between the surface and the detector for imaging the radiation scattering from the surface onto said detector and for repetitively scanning it along said detector,
   means for displacing the surface being measured relative to the source and the detector, and
   means responsive to the time relationship of said signals for generating a contour signal reflecting the change in contour dimension from said base contour dimension.

2. A gauging system according to claim 1 wherein:
   said detector comprises at least two radiation responsive cells for providing two sequential pulses in synchronism with the scan, and
   said means for generating the contour signal comprises means for generating a signal responsive to the duty cycle of said pulses.

3. A gauging system according to claim 2 wherein:
   said means for generating the contour signal includes a counter system for providing a count signal reflecting a number of predetermined equal intervals between the beginning and end of at least one pulse, and
   storage means responsive to said count signal for generating a stored signal based upon the number of intervals in said period.

4. A gauging system according to claim 3 wherein:
   said counter system includes a frequency synthesizer for generating a synthesizer signal with a frequency (NF) which is the frequency of said sequential pulses (F) multiplied by a predetermined coefficient (N), and a counter responsive to said pulses and said synthesizer signal for providing a signal reflecting the number of repetitions in the synthesizer signal occurring within the duration of one of the pulses, and said storage means comprises a ROM for generating said contour dimension signal in response to the signal from said counter.

5. A gauging system according to claim 1 wherein:

said means for imaging comprises a reciprocating mirror.

6. A gauging system for measuring the contour dimension of objects, comprising:

means for focusing the radiation output from a radiation source onto the surface of the object, a detector for generating at least two signals whose relationship manifests the scan distance on each side of a detector centerline which corresponds to the base contour dimension, imaging means located between the surface and the detector for imaging the radiation scattering from the surface onto said detector and for repetitively scanning it along said detector, means for displacing the surface being measured relative to the source and the detector, means responsive to the time relationship of said signals for generating a contour signal reflecting the change in contour dimension from said base contour dimension, means for displacing the object being measured, means responsive to a control signal for shifting the scan path on the detector a distance corresponding to a set contour dimension so that said two signals are generated, means responsive to the magnitude of said contour signal exceeding a predetermined limit for providing said control signal, means responsive to each control signal for providing a first signal reflecting the sum of the contour dimension for each control signal provided, and means responsive to said first signal and said contour signal for generating a signal reflecting the sum of the contour dimension reflected by the first signal and the contour dimension reflected by the contour signal.

* * * * *